US011006641B2

(12) United States Patent
Le Paih et al.

(10) Patent No.: US 11,006,641 B2
(45) Date of Patent: May 18, 2021

(54) SYSTEM AND METHOD FOR FORMING HAMBURGER STEAKS (71) Applicant: MAREL FRANCE, Baud (FR)

(72) Inventors: Jacques Le Paih, Plumeliau (FR); Yohann Pierre, Kervignac (FR); Bertrand Le Paih, Plumeliau (FR); Jean-Noël Grill, Languidic (FR); Johannes Martinus Meulendijks, Deurne (NL); Dirk Meskendahl, Kranenburg (DE)

(73) Assignee: MAREL FRANCE, Baud (FR)

( * ) Notice: Subject to any disclaimer, the term of this patent is extended or adjusted under 35 U.S.C. 154(b) by 22 days.

(21) Appl. No.: 15/771,686

(22) PCT Filed: Oct. 28, 2016

(86) PCT No.: PCT/FR2016/052825
§ 371 (c)(1),
(2) Date: Jan. 4, 2019

(87) PCT Pub. No.: WO2017/072471
PCT Pub. Date: May 4, 2017

(65) Prior Publication Data
US 2019/0116814 A1 Apr. 25, 2019

(30) Foreign Application Priority Data
Oct. 28, 2015 (FR) ...................... 1560316

(51) Int. Cl.
A22C 7/00 (2006.01)
A22C 17/00 (2006.01)
(52) U.S. Cl.
CPC .............. *A22C 7/0076* (2013.01); *A22C 7/00* (2013.01); *A22C 7/003* (2013.01); *A22C 7/0069* (2013.01);
(Continued)

(58) Field of Classification Search
CPC ..... A22C 7/0023; A22C 7/003; A22C 7/0046; A22C 7/0069; A22C 7/0076;
(Continued)

(56) References Cited
U.S. PATENT DOCUMENTS
2,630,458 A  3/1953 Moyle et al.
3,535,735 A * 10/1970 Egee ...................... A21C 11/16
425/377
(Continued)

FOREIGN PATENT DOCUMENTS
WO   WO 2015/012690 A2   1/2015

OTHER PUBLICATIONS

International Searching Authority, "Notification of Transmittal of The International Search Report and The Written Opinion of the International Searching Authority", for PCT/FR2016/052825, dated Feb. 13, 2017, 13 pages.
(Continued)

Primary Examiner — Seyed Masoud Malekzadeh
(74) Attorney, Agent, or Firm — Workman Nydegger (57) ABSTRACT A system for forming all variants of hamburger steaks, without being dedicated to a single variant, from a mass of meat comprises a mold including at least one cavity for forming hamburger steak, a channel for supplying the meat mass to the mold, and an element for forming an interface between the channel for supplying the meat mass and the mold. The element for forming an interface includes a pipe length having a first end connected to an outlet of the channel for supplying the meat mass and an opposite second end connected to an inlet of the mold, a grinding plate, and edges for holding the grinding plate in a cross section of the pipe length, the edges for holding the grinding plate being discretely distributed along the pipe length.

9 Claims, 9 Drawing Sheets (52) U.S. Cl.
CPC ........ *A22C 7/0092* (2013.01); *A22C 17/0026* (2013.01)

(58) Field of Classification Search
CPC . A22C 7/0092; A22C 7/0084; A22C 17/0033; A22C 17/0026; A47J 43/20
See application file for complete search history.

(56) References Cited

U.S. PATENT DOCUMENTS

| | | | | |
|---|---|---|---|---|
| 3,857,989 | A | | 12/1974 | King |
| 4,068,008 | A | * | 1/1978 | Orchard .................. A22C 7/00 425/289 |
| 4,205,415 | A | * | 6/1980 | Orchard .................. A22C 7/00 425/298 |
| 4,260,640 | A | * | 4/1981 | Hartmann ................ A22C 7/00 426/516 |
| 4,422,372 | A | * | 12/1983 | Hoezee ................... A22C 7/00 99/353 |
| 4,700,899 | A | * | 10/1987 | Powers .................... A22C 7/00 241/30 |
| 4,747,342 | A | * | 5/1988 | Schack ................... A22C 11/00 366/337 |
| 4,788,750 | A | * | 12/1988 | Bachtold .............. A22C 7/0007 425/131.5 |
| 5,030,164 | A | | 7/1991 | Wagner |
| 9,788,554 | B2 | * | 10/2017 | Van Zoelen ............. A22C 7/00 |
| 2012/0045535 | A1 | * | 2/2012 | Lindee ................. A22C 7/0084 425/436 R |
| 2014/0037811 | A1 | * | 2/2014 | Colosimo ............... A23P 30/20 426/516 |
| 2016/0374357 | A1 | * | 12/2016 | Lok .................... A22C 17/0026 425/162 |

OTHER PUBLICATIONS

French Search Report, by the Examiner from the France INPI, for French Application No. 1560316, dated Jul. 28, 2016, 8 pages.

* cited by examiner

SYSTEM AND METHOD FOR FORMING HAMBURGER STEAKS

FIELD OF INVENTION

The invention relates to a system and a method for forming ground meat pieces from a mass of meat.

BACKGROUND OF THE INVENTION

Currently, there are several variants of ground meat pieces which are differentiated by their presentation and their consistency, despite a general form of an oval or round patty. In particular, in the case of a steak called "butcher style", the hamburger meat fibres are arranged randomly in the volume of the patty forming the steak. In the case of a steak called "homemade-style", the hamburger meat fibres are all parallel against each other and positioned perpendicularly to a plane of the patty.

In order to make ground meat pieces according to either of the variants, systems for forming ground meat pieces are used. Such systems are, for example, defined in document WO2004/002229. As partially illustrated in FIG. 1, they include a base 1 including a supply pump, a hopper 11 receiving a mass of meat to be formed. The pump being connected to an outlet of the hopper, it supplies, via a supply channel, one or more inlets of a forming mould 12, here in the form of a cylindrical mould. The ground meat pieces thus formed by the mould 12 are then arranged on an output conveyor 13 for later packaging. Today, in order to make different variants of ground meat pieces, it is necessary to have a production chain dedicated to each one of the variants, in other words, to have a dedicated system for forming ground meat pieces, a system dedicated to a variant of ground meat pieces that are not able to make other variants. This involves, for a developer, to provide as many production lines as variants of ground meat pieces. This has the disadvantage of multiplying systems for forming ground meat pieces and increasing the occupied areas in the place of production.

OBJET OF THE INVENTION

An aim of the invention is to provide a system for forming ground meat pieces which enable to make all variants of ground meat pieces without being dedicated to one single variant.

SUMMARY OF THE INVENTION

To this end, a system for forming ground meat pieces from a mass of meat including a mould including at least one cavity for forming hamburger steak, a channel for supplying the mass of meat to the mould, as well as an interface forming element between the supply channel and the mould are provided, according to a first aspect of the invention, including:
- a tubular section having a first end connected to an outlet of the supply channel and an opposite second end connected to an inlet of the mould;
- a grinding plate; and,
- means for holding the grinding plate in a cross section of the tubular section, the holding means being discretely distributed along the tubular section.

Thus, the presence of holding means discretely distributed along the tubular section enables to position the grinding plate at chosen distances from the mould, thus enabling to distribute the hamburger meat fibres differently in the volume of the patty forming the final hamburger steak. Thus, all that needs to happen, is for the grinding plate to be moved within one same system for forming ground meat pieces according to different variants.

Advantageously, but optionally, the system for forming ground meat pieces according to the first aspect of the invention has at least one of the following additional technical characteristics:
- the holding means include an edge centripetally extending from an inner wall of the tubular section;
- the edge extends over a circumference of a cross section of the inner wall;
- a surface of the edge receiving by supporting the grinding plate is facing a flow of the mass of meat;
- a first holding means is situated at the level of the second end of the tubular section;
- a second holding means is situated at the level of the first end of the tubular section;
- the tubular section has a cross section varying along said tubular section;
- the cross section of the tubular section decreases from the first end towards the second end;
- the interface forming element includes an elbow part that can be removably mounted on the first end of the tubular section;
- the interface forming element includes a grinding blade connected to the grinding plate and assembled upstream of the latter;
- the interface forming element includes a disengageable drive for rotating the grinding blade;
- the drive is assembled on the elbow part, a drive shaft extending into the elbow part coaxially to the tubular section;
- the grinding blade is assembled mobile and supported by the grinding plate, and slidingly mounted on the drive;
- the cavity of the mould is mobile with respect to the inlet of the mould;
- the mould can function, rotating continuously;
- the mould can also function by alternating movement and stopping, the filling being carried out at least when stopped;
- the system further includes a meat mass injection controller, adapted to control the injection of meat mass in the cavity of the mould arranged so as to carry out the injection during a very strong deceleration of the cavity of the mould;
- the system further includes means for cutting fibres (F) injected into the cavity (140, 245) arranged so as to level the hamburger steak during development during a movement of the cavity;
- at the level of the second end of the tubular section, the interface forming element includes a nozzle for creating a series of injection flows, in particular in a mould with a series of multiple cavities;
- the nozzle includes a series of cores secured on the grinding plate;
- a series of one or more cores are arranged in the tubular section; for example, this or these core(s) extend(s) from the grinding plate up to a second end, wherein the mould has a protrusion which is aligned with this or these said core(s) in the filling position so as to create a product with a hole.

The first aspect of the invention also relates to a method for implementing the system having at least one of the preceding technical characteristics.

A method for forming ground meat pieces from a mass of meat is also provided, according to a second aspect of the invention, wherein it implements a system for forming ground meat pieces from a mass of meat including:
- a mould including at least one cavity for forming hamburger steak;
- a channel for supplying the mass of meat to the mould, the system further including an interface forming element between the supply channel and the mould including:
  - a tubular section having a first end connected to an outlet of the supply channel and an opposite second end connected to an inlet of the mould;
  - a grinding plate assembled to the first end;
  - a grinding blade connected to the grinding plate and assembled upstream of the latter, and in this system:
- the tubular section has—downstream of the grinding plate—a first part of truncated form receiving minced meat fibres at the outlet of the grinding plate arranged so as to enable a constriction of these minced meat fibres such that the hamburger steak fibres are substantially parallel to each other and constricted against each other so as to form a consistent set of parallel fibres,
- the tubular section has—downstream of the first part and adjacent to this first part—a second part substantially of cylindrical form of revolution, ending at the level of the second end,
- the tubular section is an open channel such that the consistent set of parallel fibres flows freely and without disruption along the second part of the tubular section and exits from the second end into the mould.

The second aspect of the invention also relates to a system for forming ground meat pieces from a mass of meat including:
- a mould including at least one cavity for forming hamburger steak;
- a channel for supplying the meat mass to the mould, the system further including an interface forming element between the supply channel and the mould including:
  - a tubular section having a first end connected to an outlet of the supply channel and an opposite second end connected to an inlet of the mould;
  - a grinding plate assembled at the level of the first end;
  - a grinding blade connected to the grinding plate and assembled upstream of the latter, and in this system:
- the tubular section has—downstream of the grinding plate—a first part of truncated form receiving the minced meat fibres at the outlet of the grinding plate arranged so as to enable a constriction of these minced meat fibres such that the minced meat fibres are substantially parallel to each other and constricted against each other so as to form a consistent set of parallel fibres,
- the tubular section has—downstream of the first part and adjacent to this first part—a second part substantially of cylindrical form of revolution, ending at the level of the second end,
- wherein the tubular section is an open channel such that the consistent set of parallel fibres flows freely and without disruption along the second part of the tubular section and exits from the second end into the mould.

According to a third aspect, the invention relates to a system for forming ground meat pieces from a mass of meat including:
- a mould including at least one cavity for forming hamburger steak;
- a channel for supplying the meat mass to the mould, the system further including an interface forming element between the supply channel and the mould including:
  - a tubular section having a first end connected to an outlet of the supply channel and an opposite second end connected to an inlet of the mould;
  - a grinding plate assembled at the level of the first end;
  - preferably, a grinding blade connected to the grinding plate and assembled upstream of the latter,
  - a series of one or more cores arranged in the tubular section wherein one or more cores extend from the grinding plate up to the second end, wherein the mould includes a protrusion which is aligned with the cores, when the mould is in a filling position so as to create a hamburger steak including an orifice, in particular, through-bore.

The third aspect of the invention also relates to a method for producing a hamburger steak including one or more through-bore orifices, the method implementing the preceding system.

BRIEF DESCRIPTION OF THE FIGURES

Other characteristics and advantages of the invention will appear during the description below of an embodiment as well as a variant. In the appended drawings.

DETAILED DESCRIPTION OF EMBODIMENTS

Figure 1:
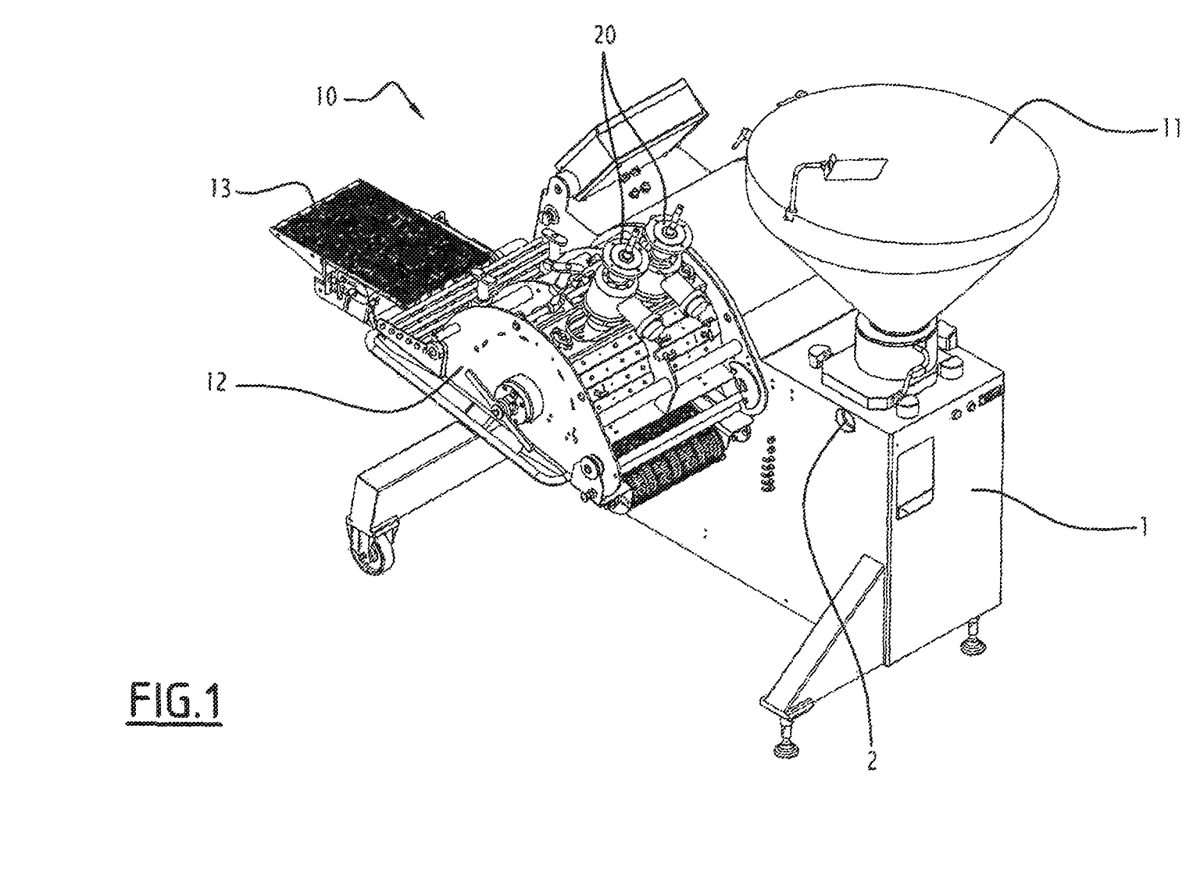
FIG. 1 is a general three-dimensional view of a system for forming ground meat pieces according to the invention.

In reference to FIG. 1, a system for forming ground meat pieces 10 according to the invention will be defined. The system for forming ground meat pieces 10 according to the invention includes a base 1 including, in a manner known per se, means for controlling and implementing the system for forming ground meat pieces 10 according to the invention. Inter alia, the base 1 includes a supply pump of which an inlet is connected to an outlet of a hopper 11 wherein is stored the meat intended for producing ground meat pieces. The meat contained in the hopper 11 can be minced or not. An outlet of the supply pump is connected to one or more inlets 121 of a mould 12 by a supply channel 3 (that can be seen in FIG. 2, for example) of the mass of meat. The supply channel 3 is connected to each one of the inlets 121 of the mould 12 via an interface forming element 21 which will be defined in more detail following this description. The mould 12 is a mould of the rotating drum type known per se. Exiting the mould 12, the system for forming ground meat pieces 10 according to the invention includes a conveyor 13 for discharging ground meat pieces developed in the mould 12 to a packaging station, for example.

Figure 2:
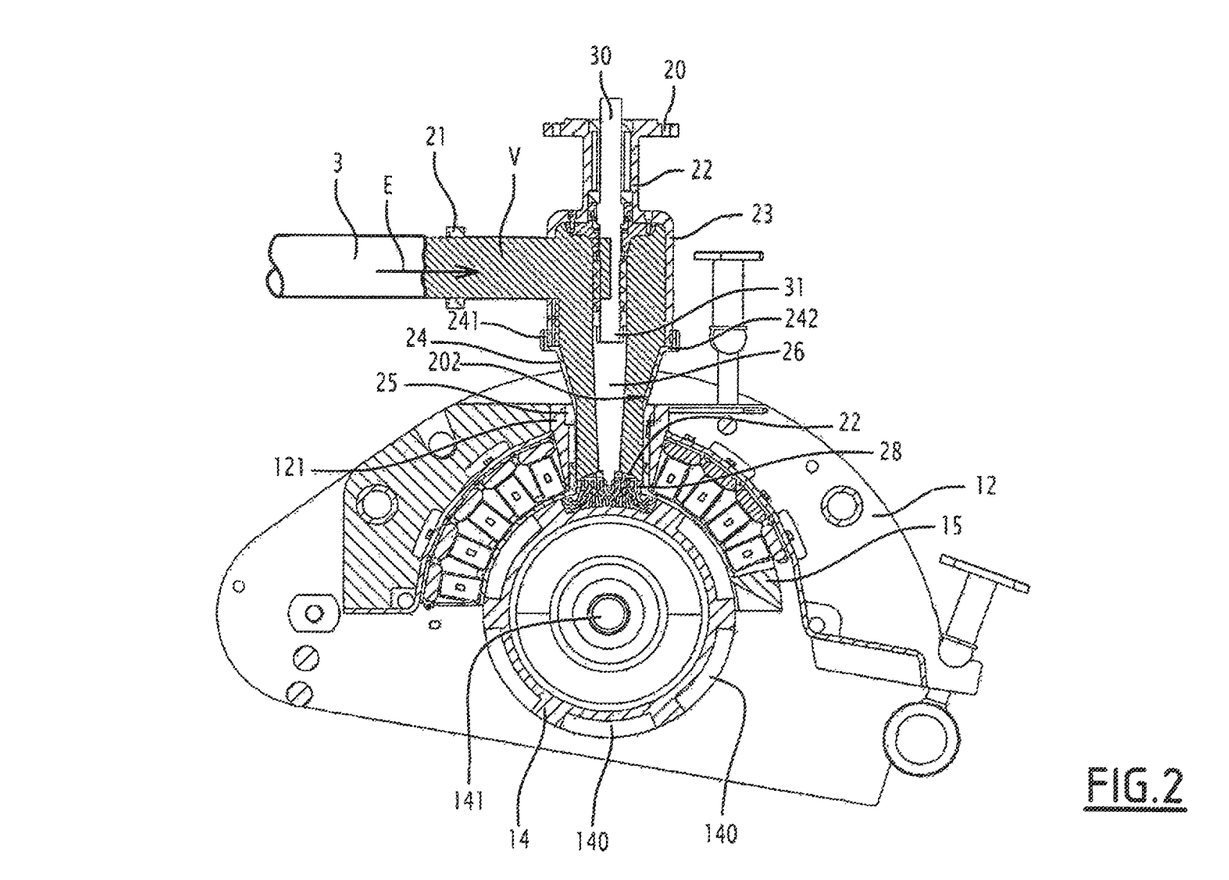
FIG. 2 is a partial cross-section view of the system for forming ground meat pieces in FIG. 1 illustrating an interface forming element between the supply channel and the mould, the grinding plate being in a first position.
Figure 3:
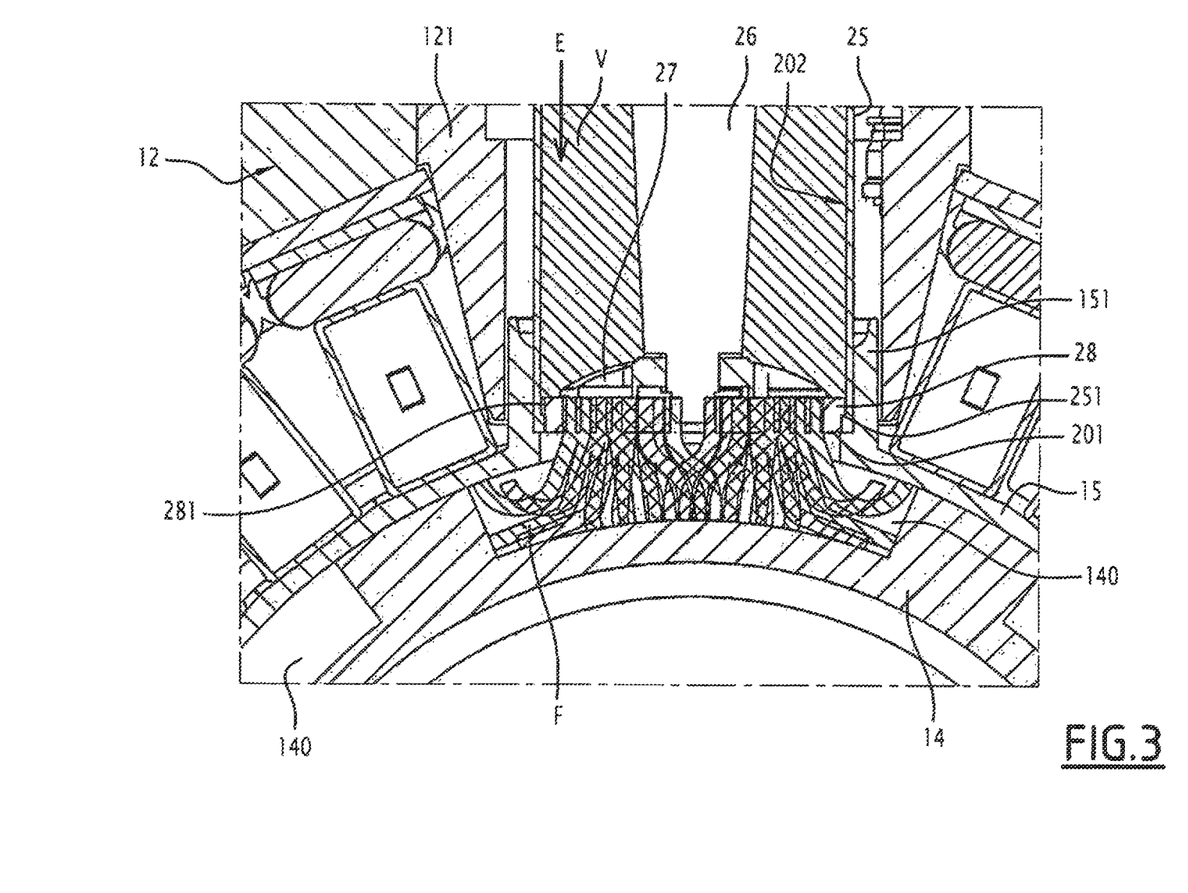
FIG. 3 is a detail of FIG. 2 at the level of the grinding plate in a first position.

In reference to FIGS. 2 and 3, the system for forming ground meat pieces 10 according to the invention in a first configuration will be defined in detail. More specifically, the interface forming element 20 for the system for forming ground meat pieces 10 according to the invention will be defined.

The interface forming element 20 includes a tubular section 24, 25 including a first end 241 connected to an outlet of the supply channel 3 via, here, an elbow part 23. The tubular section 24, 25 includes a second end 201 opposite to the first end 241 and connected to an inlet 121, 151 of the mould 12. The elbow part 23 is interleaved between the tubular section 24, 25 and the supply channel 3. The elbow part 23 is connected to the supply channel 3 at the level of an inlet 21. The elbow part 23 is connected to the first end 241 of the tubular section 24, 25 at the level of an outlet situated in an axis of the tubular section 24, 25. The system for forming ground meat pieces 10 according to the invention further includes a drive 22, 30. The drive 22, 30 includes a drive shaft 30 extending into the elbow part 23 coaxially at the axis of the tubular section 24, 25. The drive shaft 30 includes a free drive end 31 situated at the level of the outlet of the elbow part 23 without extending beyond this outlet, here.

The tubular section 24, 25 includes, here, an upper part 24, here, of truncated form extending from the first end 241 and a lower part 25 substantially of cylindrical form of revolution extending towards the second end 201 of the upper truncated part 24. The upper part 24 of truncated form therefore has, here, a cross section varying along the upper part 24 by decreasing from the first end 241 towards the second end 201 of the tubular section 24, 25. In a variant of an embodiment, the upper 24 and lower 25 parts are identical and of cylindrical form of revolution with the same cross section.

The tubular section 24, 25 includes an inner wall 202. At the level of the first end 241, the tubular section 24, 25 includes a first edge 242 extending, here, centripetally from the inner wall 202. The first edge 242 extends, in addition, over a circumference of a cross section of the inner wall 202 at the level of the first end 241, continuously. In a variant, the first edge 242 extends discontinuously and forms a series of discrete edge nozzles evenly distributed (or not) over said circumference. Similarly, at the level of the second end 201, the tubular section 24, 25 includes a second edge 251 extending, here, centripetally from the inner wall 202. The second edge 251 extends, in addition, over a circumference of a cross section of the inner wall 202 at the level of the second end 201, continuously. In a variant, the second edge 251 extends discontinuously and forms a series of discrete edge nozzles evenly distributed (or not) over said circumference.

The interface forming element 20 further includes a grinding plate 28 which is positioned in the tubular section 24, 25 perpendicularly to the axis of the tubular section 24, 25. In a manner known per se, the grinding plate 28 includes a series of orifices crossing a thickness distributed over the surface of the grinding plate 28. This, once in position in the tubular section 24, 25, the series of through-bore orifices have their axis parallel to the axis of the tubular section 24, 25. On the other hand, the grinding plate 28 includes an edge 281 over a circumference of a side wall of the grinding plate 28. The edge 281 extends centrifugally from this side wall.

In the first configuration of the system for forming ground meat pieces 10 according to the invention illustrated in FIGS. 2 and 3, the grinding plate 28 is in a first position at the level of the second end 201 of the tubular section 24, 25, the edge 281 of the grinding plate 28 thus being supported by the second edge 251 of the tubular section 24, 25. Maintaining this support is ensured by the forces exerted by a flow E of the mass of meat V passing through the grinding plate 28. Indeed, for this, a surface of the second edge 251 receiving in support the grinding plate 28 facing the flow E of the mass of meat V.

On the other hand, the interface forming element 20 includes a grinding blade 27 connected to the grinding plate 28. The grinding blade 27 is assembled on an end of a shaft extender 26 such that the latter can drive the grinding blade 27 during a rotation movement. To facilitate assembly and disassembly, the grinding blade 27 is assembled so that it can be moved sliding over the end of the shaft extender 26. The shaft extender 26 is moreover assembled free to slide over the end 31 of the drive shaft 30, the latter driving the shaft extender 26 during a rotation movement. The grinding blade 27 is supported on the grinding plate 28, upstream of it in the direction of the flow E of the mass of meat V.

The mould 12 of the system for forming ground meat pieces 10 according to the invention, here is a drum-type mould. It includes a drum 14 rotated around an axis 141. Over an outer surface, the drum 14 includes a series of cavities or air cells 140. These cavities 140 are therefore mobile and are used to form ground meat pieces in patty form from the mass of meat V exiting the interface forming element 20. On an upper part, the mould 12 includes a casing 15 of additional form to the outer surface of the drum 14. The casing 15 includes a sleeve 151 intended to receive by sliding movement at least the second end 201 of the tubular section 24, 25 of the interface forming element 20. The sleeve 151 extends into the inlet 121 of the mould 12.

In this configuration of the system for forming ground meat pieces 10 according to the invention, the grinding plate 28 is situated just at the inlet of the cavity 140. Thus, during an injection of a mass of meat V into the cavity 140, the hamburger steak fibres F are arranged randomly in the volume of the cavity 140 as illustrated in FIG. 3. This enables the development of a steak called "butcher style". With the drum 14 rotating, the system for forming ground meat pieces 10 according to the invention includes means for controlling an injection of a mass of meat V into the cavity 140. These control means are arranged so as to carry out the injection during a very strong deceleration of the drum 14, and therefore of the cavity 140, when the latter arrives at the right of the inlet 121 of the mould 12.

Figure 4:
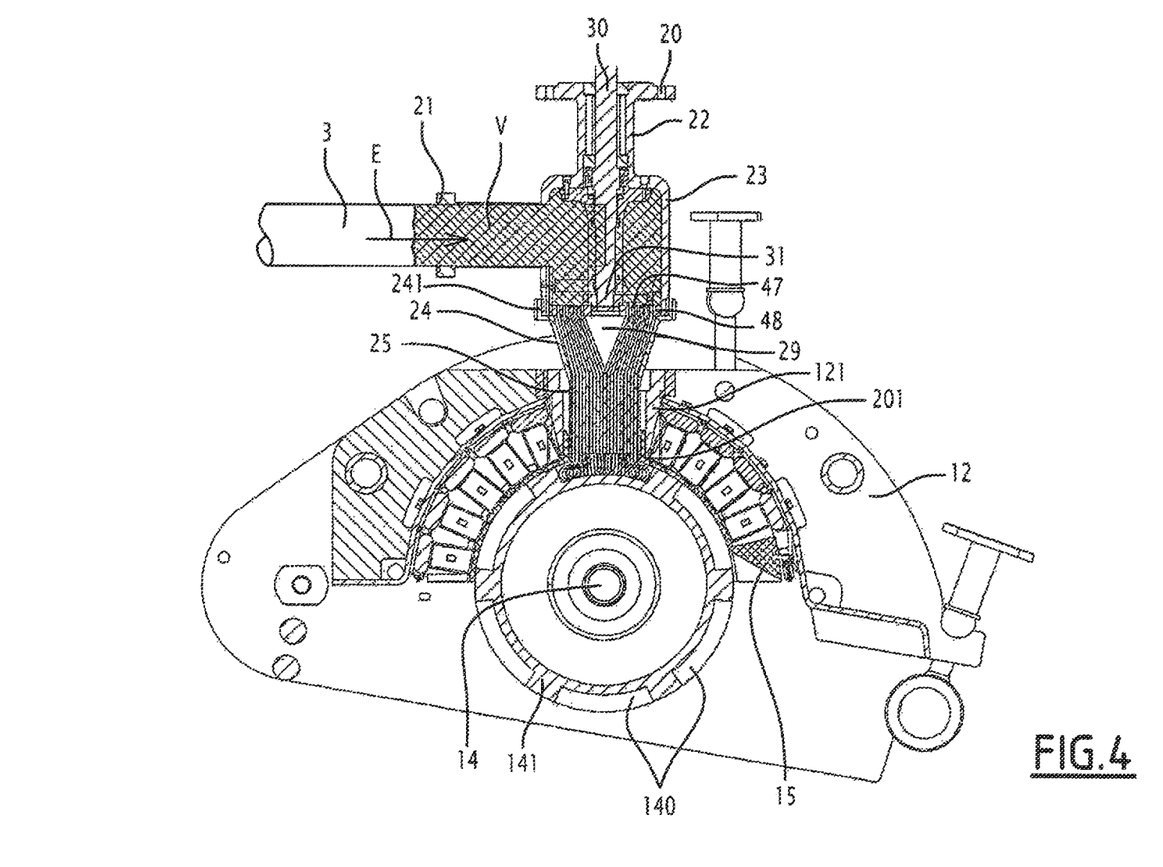
FIG. 4 is a partial cross-section view of the system for forming ground meat pieces in FIG. 1 illustrating an interface forming element between the supply channel and the mould, the grinding plate being in a second position.
Figure 5:
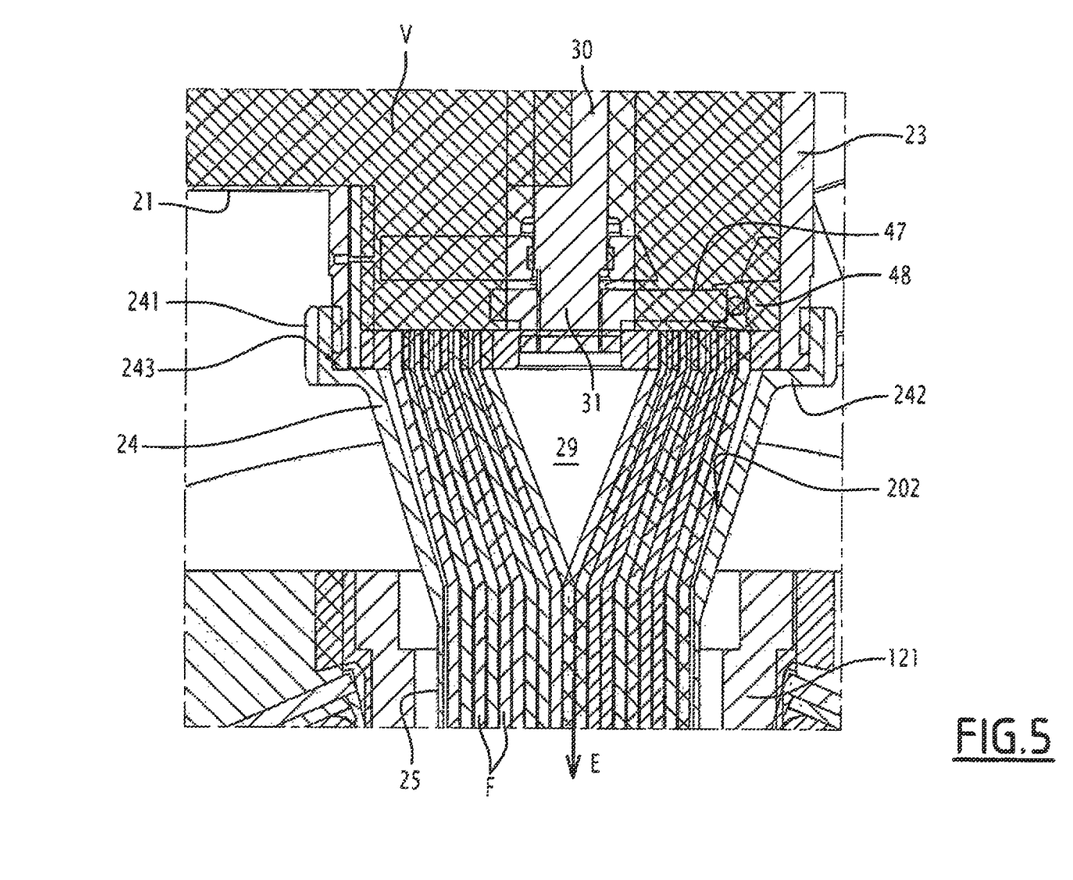
FIG. 5 is a detail of FIG. 4 at the level of the grinding plate in a second position.

Now in reference to FIGS. 4 and 5, a second configuration of the system for forming ground meat pieces 10 according to the invention will be defined. In this configuration, the grinding plate 28 is removed and is replaced by a grinding plate 48 which has a similar structure. The grinding plate 48 includes a series of orifices crossing a thickness distributed over the surface of the grinding plate 48. Thus, once in position in the tubular section 24, 25, the series of through-bore orifices have their axis parallel to the axis of the tubular section 24, 25. The grinding plate 48 is in a second position at the level of the first end 241 of the tubular section 24, 25. The grinding plate 48 is supported by a surface 243 of the first edge 242. Again, maintaining this support is ensured by forces exerted by a flow E of the mass of meat V passing through the grinding plate 48. Indeed, for this, the surface 243 of the first edge 242 receiving in support the grinding plate 48 facing the flow E of the mass of meat V.

On the other hand, the interface forming element 20 includes a grinding blade 47 connected to the grinding plate 48. The grinding blade 47 is assembled directly sliding on the end 31 of the drive shaft 30. The latter drives the grinding blade 47 during a rotation movement. Again, the grinding blade is supported by the grinding plate 47, upstream of it in the direction of the flow E of the mass of meat V.

On the other hand, in this second configuration of the system for forming ground meat pieces 10 according to the invention:

the tubular section has—downstream of the grinding plate 48—a first part of truncated form 24 receiving the hamburger steak fibres F at the outlet of the grinding plate 48 arranged so as to enable a constriction of these hamburger steak fibres such that the hamburger steak fibres are substantially parallel to each other and constricted against each other so as to form a consistent set of parallel fibres, the tubular section has—downstream of the first part of truncated form 24 and adjacent to this first part of truncated form 24—a second part 25 substantially of cylindrical form of revolution, ending at the level of the second end 201, the tubular section is an open channel such that the consistent set of parallel fibres F flows freely and without disruption along the second part 25 of the tubular section and exits from the second end 201 into the mould 247.

In this embodiment, a guide cone 29 is assembled coaxially and extending into the upper part 24 of the tubular section 24, 25 wherein a slanted angle of curved surface of the guide cone mirrors a sloped angle of the truncated form of the tubular section. In this configuration, the role of the first part 24 of truncated form of the tubular section 24, 25, assisted by the guide cone 29, is to guide and constrict the hamburger steak fibres F to the outlet of the grinding plate 48 such that the hamburger steak fibres F are substantially parallel to each other and constricted against each other so as to form a consistent set of parallel minced meat fibres.

The second cylindrical part 25 is used to guide the consistent set of fibres forward, possibly enabling an additional arrangement of the minced meat fibres overall.

It must be noted, that the tubular section 24, 25 is an open channel such that the consistent set of parallel fibres flows freely and without disruption along the second part of the tubular section and exits from the second end 201 into the mould 247. This, on the contrary to the system defined in FIG. 14 of document WO2015/012690, wherein an additional plate with holes is positioned at the level of the second end.

The consistent set of minced meat fibres is inserted into the cavity 140 of the mould 12. The hamburger steak thus produced thus includes meat fibres in the direction of the thickness of the patty forming the hamburger steak in order to form a hamburger steak called "homemade-style".

In an embodiment, at the level of the second end, the system further includes means for cutting the set of fibres F once the cavity 140, 245 is filled. For example, a cable or a cutting blade is moved through the set of fibres after filling and before the mould is moved from the filling position thereof to a position for moulding the hamburger steak thus formed. The rest of the functioning of the system for forming ground meat pieces 10 according to the invention in this second configuration is identical to the first configuration defined above.

Figure 6:
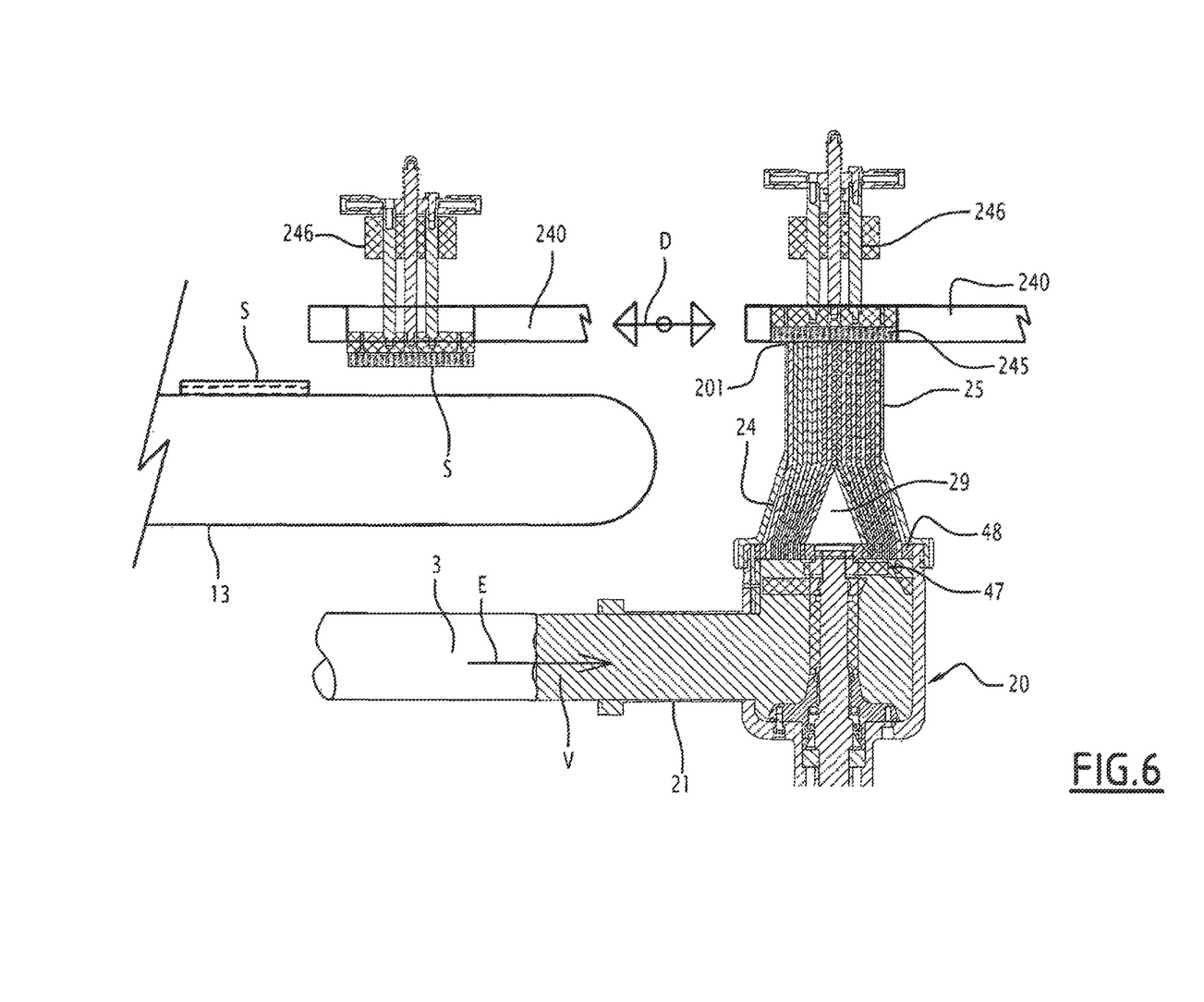
FIG. 6 is a partial cross-section and schematic view of a variant of an embodiment of the system for forming ground meat pieces according to the invention.

Now, in reference to FIG. 6, is illustrated a variant of the system for forming ground meat pieces 10 according to the invention. This variant of an embodiment of the system for forming ground meat pieces 10 according to the invention is differentiated from the method defined above by the fact that the drum-type mould is replaced by a compartment mould 240, known per se itself also. The moulding of the form of the hamburger steak S to be developed is produced in the cavities 245 which are filled, here, from the underside. A moulding system 246 then enables to mould and push off the hamburger steak S developed on the conveyor 13, following a movement D of the compartment 240 from the mould. The interface forming element 20 defined above is thus situated in the extension of the conveyor 13, as illustrated in FIG. 6. It must be noted, that the interface forming element 20 is illustrated in the second configuration defined above of the system for forming ground meat pieces 10 according to the invention, in relation to FIGS. 4 and 5. However, the interface forming element 20 according to the first configuration defined above of the system for forming ground meat pieces 10 according to the invention in relation to FIGS. 2 and 3 can be used in the same way with a compartment mould 240.

Figures 7, 8A, 8B:
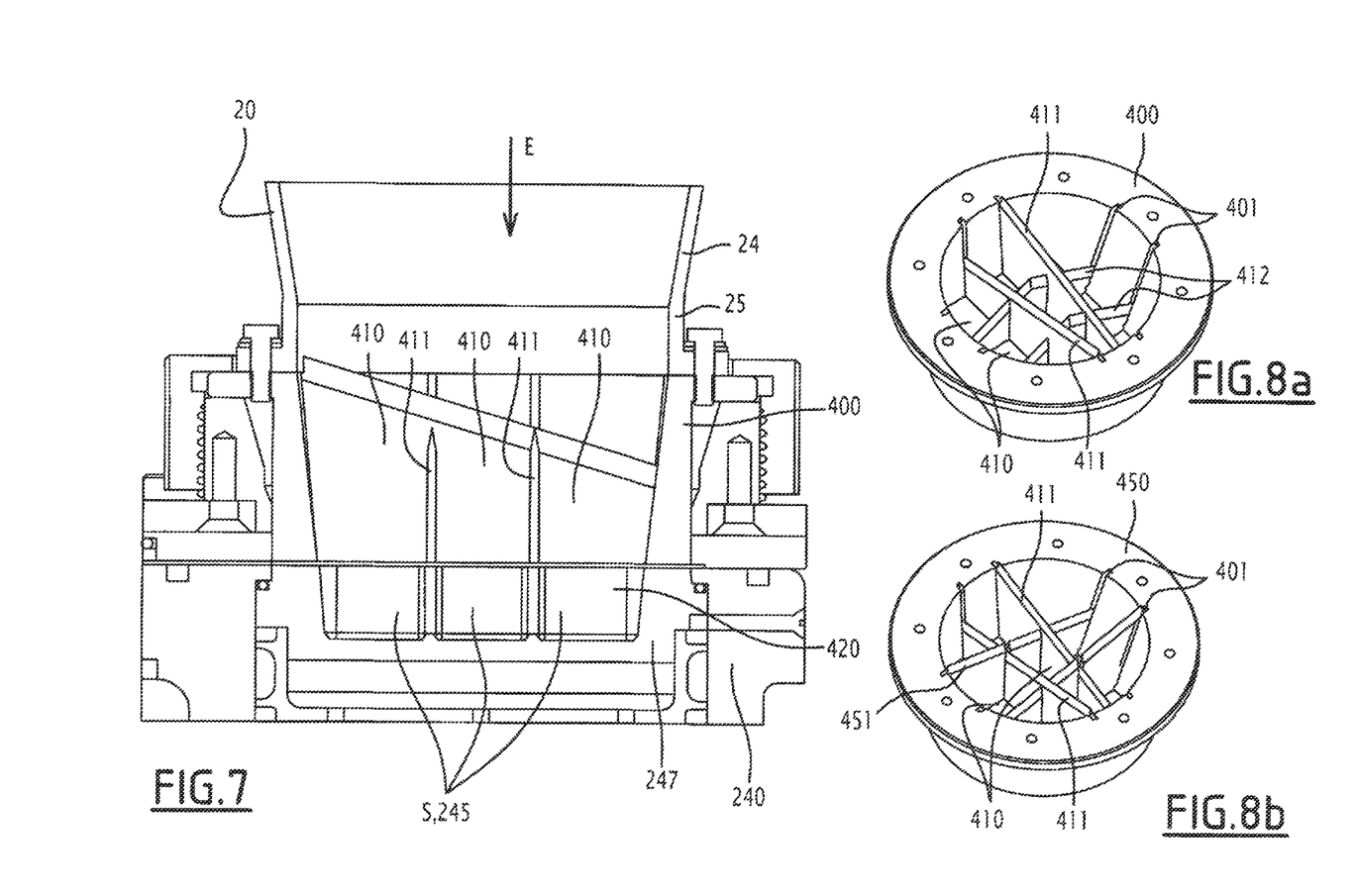
FIG. 7 is a cross-section, detailed view of another variant of an embodiment of the interface forming element between the supply channel and the mould for a system for forming ground meat pieces according to the invention.
FIGS. 8a and 8b are three-dimensional views illustrating two embodiments of an end facing the mould of the interface forming element in FIG. 7.

In reference to FIGS. 7, 8a and 8b, a second variant of an embodiment of a system for forming ground meat pieces according to the invention will be defined. This variant of an embodiment is based on the system for forming ground meat pieces defined in reference to FIG. 6. However, it can be adapted to function with a rotating drum-type mould as illustrated in FIG. 4.

The steaks S which are formed here are presented in the form of cuboids. A mould 247 assembled in a compartment 240 of other mobile mould member includes a series of cavities 245 for receiving the minced meat. Here, the series of cavities includes nine cavities 246 distributed to form a square of three-by-three cavities. Facing the mould 247 in a filling position, the interface forming element 20 is similar to the second configuration defined above of the system for forming ground meat pieces 10 according to the invention in relation to FIGS. 4 and 5. The lower part 25 of the tubular section 24, 25, includes a nozzle 400, 450 which enables to separate the minced meat flow E that forms the set of minced meat fibres from the first truncated part 24 into several injection flows 410, here, nine of them, of which the cross-section dimensions correspond to those of the cavities 245 of the mould 247. Because of this, at the time of forming the steaks S, an injection flow 410 is found facing a cavity 245 of the mould 247. The cross-section size of the injection flows 410 is produced within the nozzle 400, 450 by walls 411, 412 and 451. Here, these walls have an upper bevelled edge so as to form a cutter enabling an easy separation of the flow or set E of minced meat. The walls 411, 412 and 451 are inserted in the recesses 401 extending along a generator of an inner wall of the nozzle 400, 450. In addition, the upper bevel of the walls 411, 412, 451 extends along a tilt angle, in relation to a cross-section plane of the nozzle 400, 450.

Figure 9:
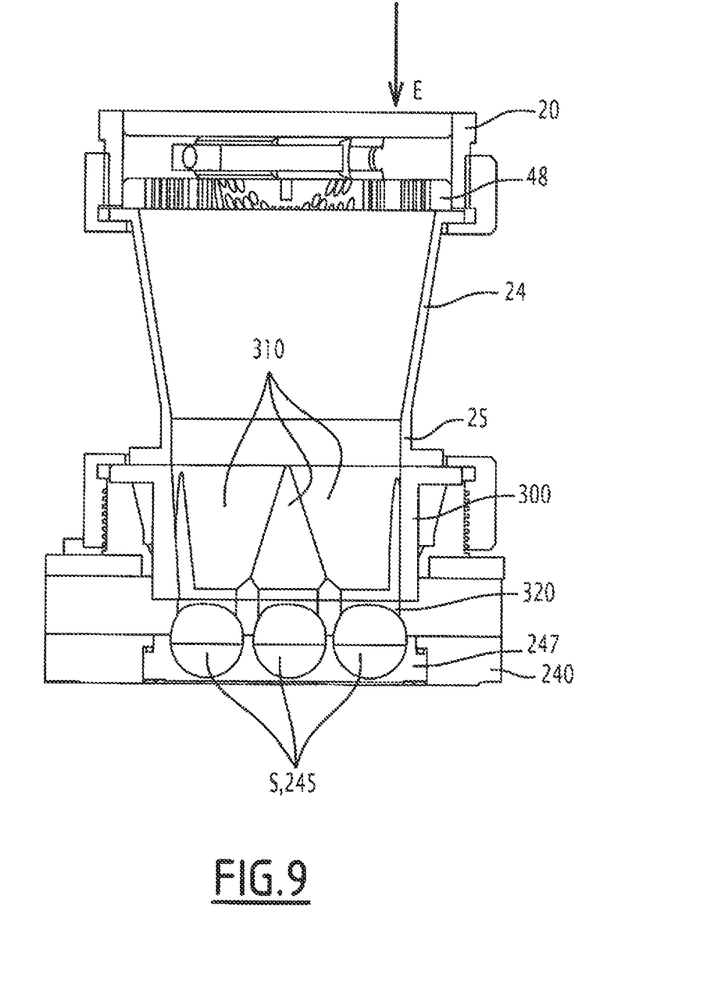
FIG. 9 is a cross-section, detailed view of an additional variant of an embodiment of the interface forming element between the supply channel and the mould for a system for forming ground meat pieces according to the invention; and, FIG. 10 is a three-dimensional, cross-section view of another variant of an embodiment of the interface forming element between the supply channel and the mould for a system for forming ground meat pieces according to the invention.

In reference to FIG. 9, a third variant of an embodiment of a system for forming ground meat pieces according to the invention will be defined. This variant of an embodiment is based, as the preceding one, on the system for forming the ground meat pieces defined in reference to FIG. 6. However, it can be adapted to function with a rotating drum-type mould as illustrated in FIG. 4.

The steaks S which are formed here are presented in the general form of a bowl. A mould 247 assembled in a compartment 240 includes a series of cavities 245, here substantially spherical, for receiving the minced meat. Here, the series of cavities includes six cavities 245 distributed to form two parallel rows, each with three cavities. Facing the mould 247 in a filling position, the interface forming element 20 is, again, similar to the first configuration defined above of the system for forming ground meat pieces 10 according to the invention in relation to FIGS. 2 and 3. The lower part 25 of the tubular section 24, 25, ends by a nozzle 300 which enables to separate the minced meat flow E into several injection flows 310, here six of them, of which the cross-section dimensions of an end 320 correspond to those of the cavities 245 of the mould 247. Because of this, at the time of forming the steaks S, an injection flow 310 is found facing a cavity 245 of the mould 247. The cross-section sizing of the injection flows 310 is done within the nozzle 300 by the truncated pipes.

Figure 10:
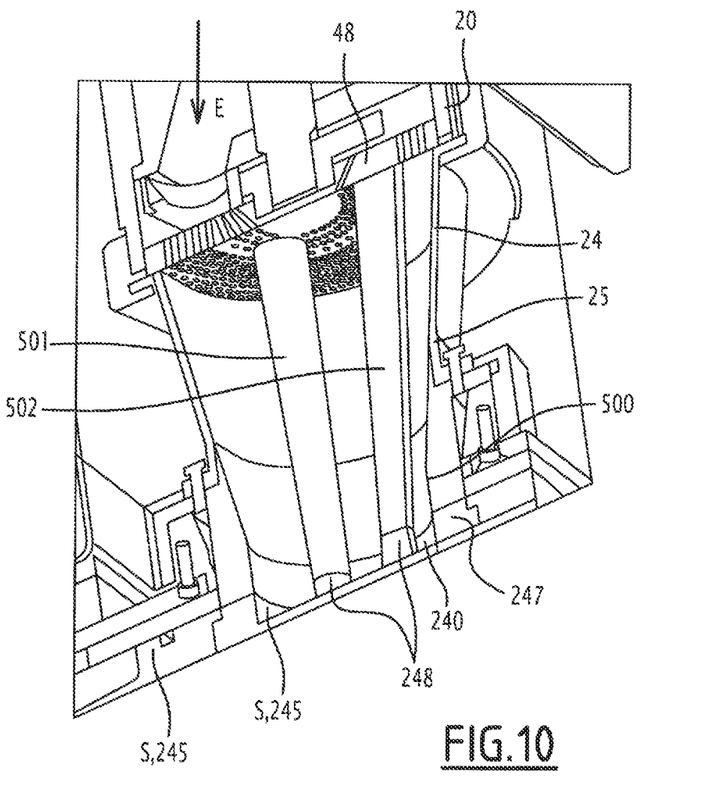

In reference to FIG. 10, a fourth variant of an embodiment of a system for forming ground meat pieces according to the invention will be defined. This variant of an embodiment is based, like the preceding ones, on the system for forming ground meat pieces defined in reference to FIG. 6. However, it can be adapted to function with a rotating drum-type mould as illustrated in FIG. 4.

In this fourth variant of an embodiment, the steaks S formed as presented in the form of a patty having recesses crossing a thickness of the patty. For example, the patty is round and includes three recesses in the form of eyes and a mouth to represent an emoticon. A mould 247 assembled in a compartment 240 includes a cavity 245 for receiving the minced meat as well as protrusions 248 extending protruding from a base of the cavity 245 and corresponding to the recesses to be made in the patty. Facing the mould 247 in a filling position, the interface forming element 20 is, again, similar to the first configuration defined above of the system for forming ground meat pieces 10 according to the invention in relation to FIGS. 2 and 3. The lower part 25 of the tubular section 24, 25, ends by a nozzle 500 which enables to form the minced meat flow E into an injection flow of which the cross section, exiting the interface forming element 20, is similar to a cross section of the steak S to be formed in the mould 247. For this, the nozzle 500 includes a series of cores 501 and 502 which extend parallel to the minced meat flow E and substantially perpendicularly to a cross section of the nozzle 500. The cores 501 and 502 have a lower end which is positioned facing the connected protrusion 248, once the mould 247 is in a filling position. In the embodiment illustrated in FIG. 10, the cores 501 and 502 extend longitudinally through the tubular section 24, 25 such that an opposite end of the cores comes into contact with the grinding plate 48. The means for securing this opposite end are provided to secure the cores 501 and 502 on the grinding plate 48.

In a variant of an embodiment, the cores 501 and 502 are shorter, their opposite end thus being tapered, so as to not be extended in the tubular section 24, 25, or so as to be extended over a very short distance in the tubular section 24, 25. The cores 501 and 502 are thus held in place in the nozzle 500 by thin arms extending into a cross-section plane of the nozzle 500, connecting the cores 501 and 502 to an inner wall of the nozzle 500.

Other types of nozzles as those 300, 400, 450 which come to be defined can be used according to the form of the hamburger steak to be produced.

All the connections of the supply channel 3 on the inlet 21 of the interface forming element 20, of the elbow part on the first end 241 of the tubular section 24, 25 and of the second end 201 of the tubular section 24, 25 in the inlet 121 of the mould are made simply and quickly: for example, by press-fitting and/or quarter-turn or eighth-turn type turning. This enables a quick disassembly and reassembly of the system for forming ground meat pieces 10 according to the invention during a change of configuration. It is the same for the implementation of the grinding plate 28 or 48 and the connected grinding blade 27 or 47 thereof as defined above. Thus, the variant of ground meat pieces to be developed is simple and quick to change on a system for forming ground meat pieces 10 according to the invention.

On the other hand, although the positioning of the grinding plate 28, 48 has been defined at the level of edges 242, 251 forming the holding means of the grinding plate and situated at the ends of the tubular section 24, 25, it is possible to provide other holding means discretely distributed along the tubular section 24, 25 between the first end 241 and the second end 201 according to the distribution of the minced meat fibres F within the volume of the moulding cavity 140, 245.

In another variant of an embodiment of the system for forming ground meat pieces 10 according to the invention, the supply channel 3 is directly connected to the first end of the tubular section 24, 25.

According to another embodiment, in the case where the mass of meat V passing in trans it through the supply channel 3 is already minced, the grinding blade 27, 47 is not necessary for the steak making process and cannot be assembled, the grinding plate 28, 48 thus being used by itself. An injection pressure provided by the supply pump is thus sufficient to make the mass of meat pass through the grinding plate.

In another variant of an embodiment of the system for forming ground meat pieces 10 according to the invention, the latter further includes means for cutting the fibres F injected into the cavity 140, 245 of the mould 12 in order to level the hamburger steak during development, so as to reduce as much as possible, a modification of the arrangement of the fibres F in the hamburger steak when the cavity 140, 245 is moved after an injection. These cutting means are appropriately situated just above the inlet of the cavity 140, 245, downstream of the grinding plate. For example, these cutting means can be a series of taut cutting wires parallel to the rotation axis of the drum 14 through the inlet of the cavity 140. According to another example, these cutting means can be a blade or a cutter arranged so as to cross by levelling a cross section of the inlet of the cavity.

Of course, it is possible to bring numerous modifications to the invention without moving away from the scope thereof.

The invention claimed is:

1. A system for forming ground meat pieces from a mass of meat including:
   a mould including at least one cavity for forming hamburger steak;
   a channel for supplying the mass of meat to the mould, wherein the system further includes an interface forming element between the channel for supplying the meat mass and the mould including:
   a tubular section having a first end connected to an outlet of the channel for supplying the meat mass and an opposite second end connected to an inlet of the mould;
   a grinding plate assembled at a level of the first end;
   a grinding blade connected to the grinding plate and assembled upstream of the grinding plate;
wherein:
   the tubular section has, at downstream of the grinding plate, a first part of truncated form receiving minced meat fibers at an outlet of the grinding plate arranged so as to enable a constriction of the minced meat fibers such that the minced meat fibers are substantially parallel to each other and constricted against each other so as to form a set of parallel fibers,
   the tubular section has, at downstream of the first part and adjacent to the first part, a second part with a substantially constant cross section ending at a level of the second end, wherein the tubular section is an open channel such that the set of parallel fibers flows freely and without disruption along the second part of the tubular section and exits from the second end into the mould,
wherein a guide cone is assembled coaxially and extending into the first part of the tubular section, wherein a slanted angle of curved surface of the guide cone mirrors a sloped angle of the truncated form of the tubular section, and wherein a cross section along the first part of the truncated form decreases from the first end towards the second end of the tubular section.

2. The system according to claim 1, wherein the interface forming element includes an elbow part that removably mounted to the first end of the tubular section.

3. The system according to claim 1, wherein the interface forming element includes a disengageable drive for rotating the grinding blade.

4. The system according to claim 1, wherein the interface forming element includes an elbow part that is removably mounted to the first end of the tubular section, and wherein the interface forming element includes a disengageable drive for rotating the grinding blade,
   wherein the drive is assembled on the elbow part, and
   wherein a drive shaft extends into the elbow part coaxially to the tubular section.

5. The system according to claim 3, wherein the grinding blade is assembled mobile and supported by the grinding plate, and slidingly mounted on the drive.

6. The system according to claim 1, wherein the at least one mould cavity is mobile with respect to the inlet of the mould.

7. The system according to claim 1, further comprising a fiber cutter for cutting fibers injected into the cavity, the set of parallel.

8. The system according to claim 1, wherein at the level of the second end of the tubular section, the interface forming element includes a nozzle for creating a series of injection flows into the mould with a series of multiple cavities.

9. The system according to claim 1, wherein a series of one or more cores are arranged in the tubular section, the one or more cores extending from the grinding plate up to the second end,
   wherein the mould has a protrusion which is aligned with the one or more cores in a filling position so as to create a product with a hole.

* * * * *